United States Patent
Park et al.

(10) Patent No.: US 12,130,537 B2
(45) Date of Patent: Oct. 29, 2024

(54) LIQUID LENS CONTROL APPARATUS

(71) Applicant: LG INNOTEK CO., LTD., Seoul (KR)

(72) Inventors: Jung Bae Park, Seoul (KR); Chang Wook Kim, Seoul (KR); Yong Sung Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 484 days.

(21) Appl. No.: 17/625,614

(22) PCT Filed: Jul. 7, 2020

(86) PCT No.: PCT/KR2020/008836
§ 371 (c)(1),
(2) Date: Jan. 7, 2022

(87) PCT Pub. No.: WO2021/006591
PCT Pub. Date: Jan. 14, 2021

(65) Prior Publication Data
US 2022/0260888 A1    Aug. 18, 2022

(30) Foreign Application Priority Data

Jul. 9, 2019   (KR) .................. 10-2019-0082810

(51) Int. Cl.
*G02F 1/29*       (2006.01)
*G01C 19/00*      (2013.01)

(52) U.S. Cl.
CPC ............ *G02F 1/294* (2021.01); *G01C 19/00* (2013.01)

(58) Field of Classification Search
CPC ................. G02F 1/294; G01C 19/00

USPC ........................ 359/315, 665, 666
See application file for complete search history.

(56) References Cited

U.S. PATENT DOCUMENTS

2009/0302197 A1   12/2009   Uchino et al.
2016/0000333 A1    1/2016   Kitagawa
2020/0174165 A1    6/2020   Choi

FOREIGN PATENT DOCUMENTS

| JP | 2009-47801 A | 3/2009 |
| JP | 2015-79259 A | 4/2015 |
| JP | 2016-13286 A | 1/2016 |
| KR | 10-2018-0092140 A | 8/2018 |
| KR | 10-1972052 B1 | 4/2019 |
| WO | WO 2019/099648 A1 | 5/2019 |

*Primary Examiner* — William Choi
(74) *Attorney, Agent, or Firm* — Birch, Stewart, Kolasch & Birch, LLP

(57) ABSTRACT

According to an embodiment, a liquid lens control apparatus includes a liquid lens configured to control an interface between liquids in response to a driving voltage, a voltage booster configured to increase the level of a supply voltage and output a voltage having a higher level than the supply voltage, a controller configured to control the driving voltage, and a gyro sensor configured to sense the movement of the liquid lens and output a signal corresponding to the movement of the liquid lens. The controller acquires a signal corresponding to the movement of the liquid lens output from the gyro sensor during a period in which the voltage booster is in an OFF state, and controls the driving voltage using the signal corresponding to the movement of the liquid lens.

20 Claims, 3 Drawing Sheets

[FIG. 1]
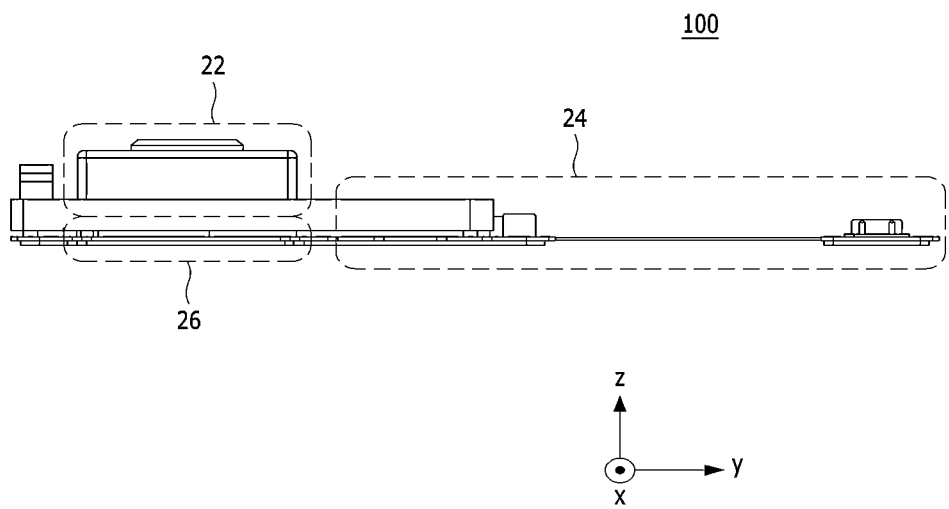
[FIG. 2]
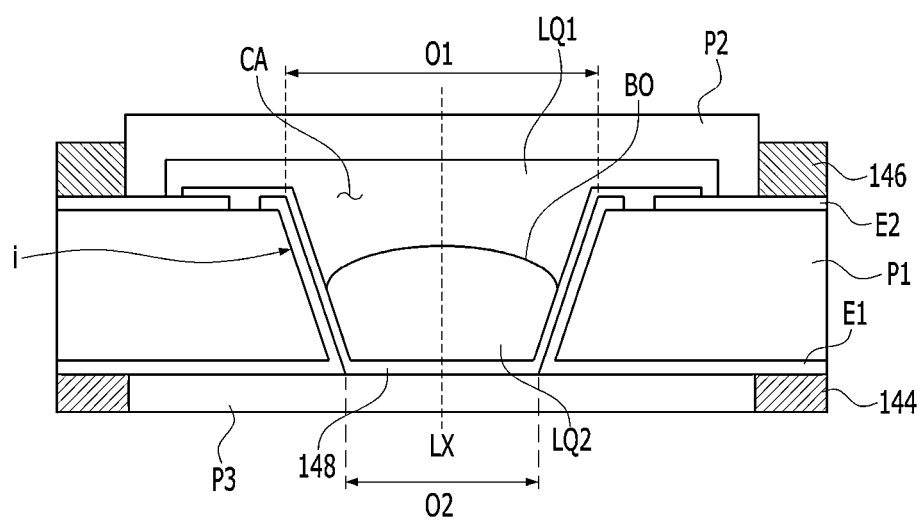

[FIG. 3]
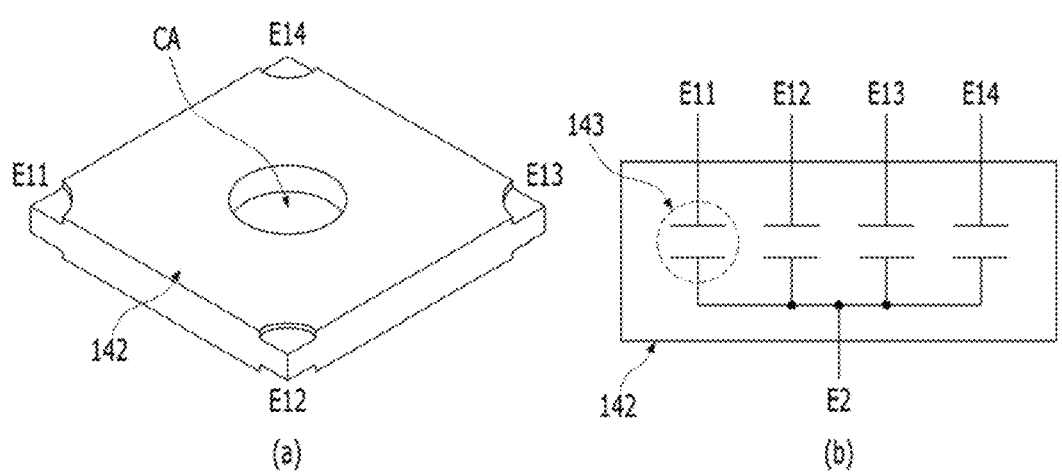

[FIG. 4]
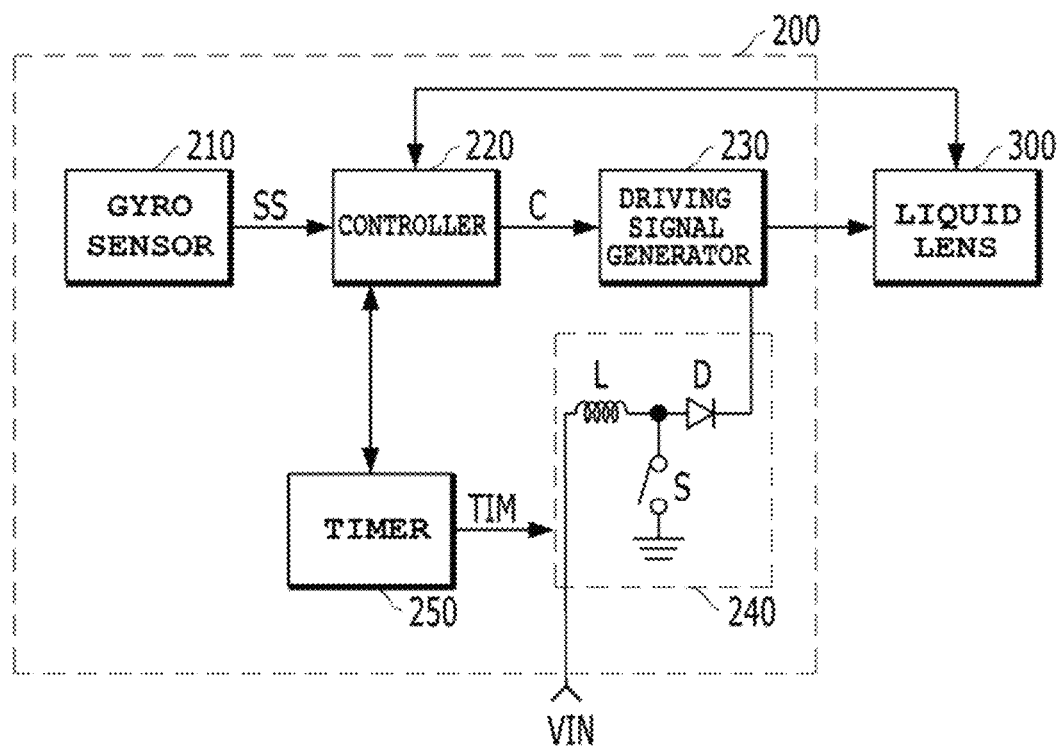
[FIG. 5]
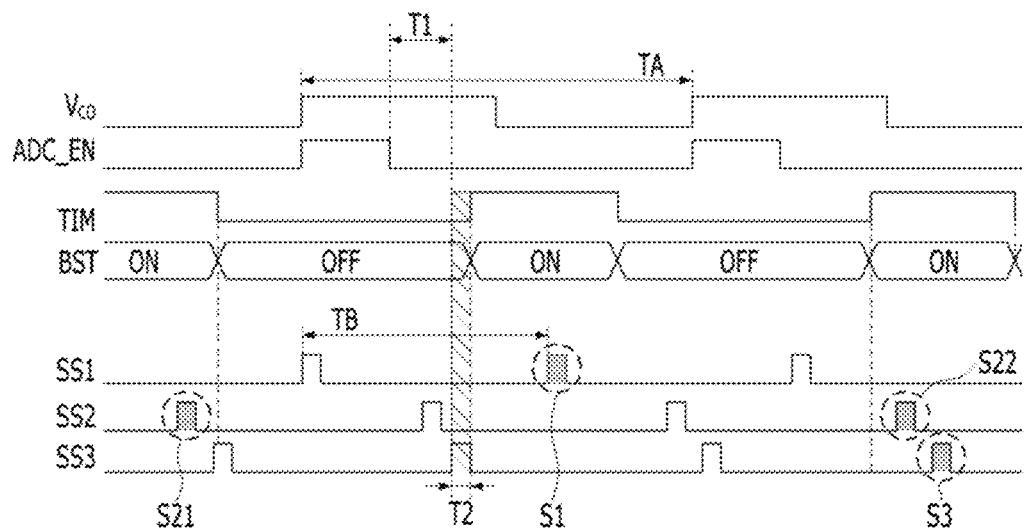

LIQUID LENS CONTROL APPARATUS

CROSS REFERENCE TO RELATED APPLICATIONS

This application is the National Phase of PCT International Application No. PCT/KR2020/008836, filed on Jul. 7, 2020, which claims priority under 35 U.S.C. 119(a) to Patent Application No. 10-2019-0082810, filed in the Republic of Korea on Jul. 9, 2019, all of which are hereby expressly incorporated by reference into the present application.

TECHNICAL FIELD

Embodiments relate to a liquid lens control apparatus.

BACKGROUND ART

People who use portable devices demand optical devices that have high resolution, are small, and have various photographing functions. For example, the various photographing functions may include at least one of an optical zoom-in/zoom-out function, an auto-focusing (AF) function, or a hand-tremor compensation or optical image stabilization (OIS) function.

Conventionally, the aforementioned various photographing functions are realized by combining a plurality of lenses and directly moving the combined lenses. In the case in which the number of lenses is increased, however, the size of an optical device may increase.

The AF function and the OIS function are performed by moving or tilting a plurality of lenses, which are fixed to a lens holder and are aligned with an optical axis, in the optical-axis direction or in a direction perpendicular to the optical axis. To this end, a separate lens-moving apparatus is used to move a lens assembly constituted by a plurality of lenses. However, the lens-moving apparatus consumes a lot of power, and an additional cover glass needs to be provided separately from a camera module in order to protect the lens-moving apparatus, thus leading to an increase in the overall size of the conventional camera module. In order to solve this, research has been conducted on a liquid lens configured to electrically adjust the curvature of an interface between two types of liquids in order to perform the AF function and the OIS function.

In the conventional camera module, a liquid lens control apparatus uses a gyro sensor in order to perform the OIS function. However, a gyro sensor has a problem of being sensitive to noise.

DISCLOSURE

Technical Problem

Embodiments may provide a liquid lens control apparatus for removing or minimizing noise included in output from a gyro sensor.

The objects to be accomplished by the embodiments are not limited to the above-mentioned objects, and other objects not mentioned herein will be clearly understood by those skilled in the art from the following description.

Technical Solution

According to an embodiment, a liquid lens control apparatus may include a liquid lens configured to control an interface between liquids in response to a driving voltage, a voltage booster configured to increase a level of a supply voltage and output a voltage having a higher level than the supply voltage, a controller configured to control the driving voltage, and a gyro sensor configured to sense the movement of the liquid lens and output a signal corresponding to the movement of the liquid lens. The controller may acquire a signal corresponding to the movement of the liquid lens output from the gyro sensor during a period in which the voltage booster is in an OFF state, and may control the driving voltage using the signal corresponding to the movement of the liquid lens.

For example, the liquid lens control apparatus may further include a driving signal generator configured to supply the driving voltage to the liquid lens using a voltage output from the voltage booster, and the controller may control the driving signal generator using a signal corresponding to the movement of the liquid lens.

For example, the controller may acquire a signal corresponding to the movement of the liquid lens during a period in which the voltage booster is in an OFF state.

For example, a period in which the controller acquires a signal corresponding to the movement of the liquid lens may be closer to a time point at which the voltage booster is turned from OFF to ON than to a time point at which the voltage booster is turned from ON to OFF.

For example, the liquid lens may include an individual electrode and a common electrode to which the driving voltage is applied, and may perform analog-to-digital conversion (ADC) on a capacitance between the individual electrode and the common electrode, corresponding to the interface of the liquid lens, in an OFF state of the voltage booster. The controller may acquire a signal corresponding to the movement of the liquid lens after the ADC has been performed.

For example, the voltage booster may include an inductor having one side connected to an input terminal to which the supply voltage is input and a switch disposed between the opposite side of the inductor and a reference potential. The voltage booster may increase the level of the supply voltage through switching operation of the switch, and may output a voltage having a higher level than the supply voltage.

For example, the frequency of the signal output from the gyro sensor and the ON/OFF frequency of the voltage booster may be different from each other.

For example, the ADC may be controlled to be performed when an ADC enable pulse is turned ON, and the controller may acquire a signal corresponding to the movement of the liquid lens after a predetermined time period elapses from a time point at which the ADC enable pulse is turned OFF.

For example, the predetermined time period may be 30 µs to 40 µs.

For example, the supply voltage may be 1.8 volts to 5 volts, and an increased level of the supply voltage output from the voltage booster may be 50 volts or more.

Advantageous Effects

A liquid lens control apparatus according to embodiments controls a liquid lens using a motion signal having no noise caused by a voltage booster, which outputs a relatively high voltage, thereby improving an OIS function performed by a camera module including the liquid lens.

In addition, a liquid lens control apparatus according to embodiments controls a liquid lens using a motion signal having no noise or reduced noise. As a result, when the excitation frequency is 2 Hz to 10 Hz, the suppression ratio of the liquid lens may be improved.

However, the effects achievable through the embodiments are not limited to the above-mentioned effects, and other effects not mentioned herein will be clearly understood by those skilled in the art from the following description.

DESCRIPTION OF DRAWINGS

FIG. 1 is a schematic cross-sectional view of a camera module according to an embodiment.

FIG. 2 is a cross-sectional view of a general liquid lens unit.

FIGS. 3(a) and (b) are views for explaining a liquid lens, the interface of which is adjusted in response to a driving voltage.

FIG. 4 is a block diagram of a liquid lens control apparatus according to an embodiment.

FIG. 5 is a waveform diagram of each part of a liquid lens control apparatus according to an embodiment.

BEST MODE

Hereinafter, exemplary embodiments of the present disclosure will be described in detail with reference to the accompanying drawings.

The examples, however, may be embodied in many different forms, and should not be construed as being limited to the embodiments set forth herein. Rather, within the spirit and scope of the present disclosure, one or more components may be selectively and operatively combined or substituted.

Unless otherwise defined, all terms used herein (including technical and scientific terms) have the same meanings as commonly understood by those skilled in the art. It will be further understood that terms, such as those defined in commonly used dictionaries, should be interpreted as having meanings consistent with their meanings in the context of the relevant art.

Terms used in the specification are provided for description of the embodiments, and the present disclosure is not limited thereto. In the specification, singular forms in sentences include plural forms unless otherwise noted. The term "at least one" (or "one or more") should be understood as including all possible combinations that can be suggested from one or more relevant items. For example, the meaning of "at least one of a first item, a second item, or a third item" may be each one of the first item, the second item, or the third item, and may also be all possible combinations that can be suggested from two or more of the first item, the second item, and the third item.

Additionally, terms such as "first", "second", "A", "B", "(a)", "(b)", etc. may be used herein to describe the components of the embodiments. These terms are only used to distinguish one element from another element, and the essence, order, or sequence of corresponding elements is not limited by these terms.

It should be noted that if it is described in the specification that one component is "connected", "coupled", or "joined" to another component, the former may be directly "connected", "coupled", or "joined" to the latter, or may be indirectly "connected", "coupled", or "joined" to the latter via another component.

It will be understood that when an element is referred to as being "on" or "under" another element, it can be directly on/under the element, or one or more intervening elements may also be present. When an element is referred to as being "on" or "under," "under the element" as well as "on the element" can be included based on the element.

A variable lens may be a variable focus lens. Further, a variable lens may be a lens that is adjustable in focus. A variable lens may be at least one of a liquid lens, a polymer lens, a liquid crystal lens, a voice coil motor (VCM) type, or a shape memory alloy (SMA) type. A liquid lens may include a liquid lens including one liquid and a liquid lens including two liquids. A liquid lens including one liquid may change the focus by adjusting a membrane disposed at a position corresponding to the liquid, for example, by pressing the membrane using the electromagnetic force between a magnet and a coil. A liquid lens including two liquids may include a conductive liquid and a non-conductive liquid, and may adjust the interface formed between the conductive liquid and the non-conductive liquid using the voltage applied to the liquid lens. A polymer lens may change the focus by controlling a polymer material using a driving unit such as a piezo actuator. A liquid crystal lens may change the focus by controlling a liquid crystal using electromagnetic force. A VCM type may change the focus by adjusting a solid lens Or a lens assembly including a solid lens using the electromagnetic force between a magnet and a coil. An SMA type may change the focus by controlling a solid lens or a lens assembly including a solid lens using a shape memory alloy.

Hereinafter, a variable lens to be controlled by a control apparatus according to an embodiment will be described as being a liquid lens. However, the following description may also be applied to a case where the control apparatus according to the embodiment controls variable lenses other than a liquid lens.

Although the liquid lens control apparatus will be described using the Cartesian coordinate system (x-axis, y-axis, z-axis) for convenience of description, it may also be described using any of other coordinate systems. Although the x-axis, the y-axis, and the z-axis of the Cartesian coordinate system are perpendicular to each other, the embodiment is not limited thereto. That is, the x-axis, the y-axis, and the z-axis may intersect each other obliquely.

Hereinafter, a liquid lens 142 and a camera module 100 will be described with reference to the accompanying drawings prior to describing a liquid lens control apparatus 200 according to an embodiment.

FIG. 1 is a schematic cross-sectional view of a camera module 100 according to an embodiment.

Referring to FIG. 1, the camera module 100 may include a lens assembly 22, a control circuit 24, and an image sensor 26.

The lens assembly 22 may include at least one lens unit. The at least one lens unit may include first and second lenses and a liquid lens unit (or a liquid lens module).

The control circuit 24 may serve to control a lens unit, e.g. a liquid lens unit, and to supply a driving voltage (or an operating voltage) for driving the liquid lens unit. The control circuit 24 may be implemented in the form of an integrated circuit (IC). The control circuit 24 may include a liquid lens control apparatus 200 according to an embodiment to be described later.

The image sensor 26 may function to convert light that has passed through the first lens, the liquid lens unit, and the second lens into image data. More specifically, the image sensor 26 may convert light into analog signals through a pixel array including a plurality of pixels, and may synthesize digital signals corresponding to the analog signals to generate image data.

The control circuit 24 and the image sensor 26 described above may be disposed on a single printed circuit board (PCB). However, this is merely exemplary, and the embodiment is not limited thereto.

When the camera module 100 is applied to an optical device (or an optical instrument), the configuration of the control circuit 24 may be designed differently according to the specifications required for the optical device. In particular, the control circuit 24 may be implemented as a single chip in the form of an integrated circuit (IC).

The first lens may be disposed on the lens assembly 22, and may be a region on which light is incident from outside the lens assembly 22. The first lens may be implemented as a single lens, or may be implemented as two or more lenses that are aligned with a central axis to form an optical system. Here, the central axis may be an optical axis LX of an optical system that is formed by the first lens, the liquid lens unit, and the second lens included in the camera module 100, or may be an axis parallel to the optical axis LX. The optical axis LX may correspond to the optical axis of the image sensor 26. That is, the first lens, the liquid lens unit, the second lens, and the image sensor 26 may be disposed so as to be aligned with the optical axis LX through active alignment (AA). Here, the active alignment may be the operation of aligning the optical axis of each of the first lens, the second lens, and the liquid lens unit with the optical axis of the image sensor 26.

The second lens may be disposed under the liquid lens unit. The second lens may be spaced apart from the first lens in the optical-axis direction (e.g. the z-axis direction).

The light incident on the first lens from outside the camera module 100 may pass through the liquid lens unit, and may be incident on the second lens. The second lens may be implemented as a single lens, or may be implemented as two or more lenses that are aligned with the central axis to form an optical system.

Unlike the liquid lens unit, each of the first lens and the second lens may be a solid lens, and may be formed of plastic. However, the disclosure is not limited as to the specific material of each of the first lens and the second lens.

FIG. 2 is a cross-sectional view of a general liquid lens unit.

The liquid lens unit shown in FIG. 2 may include a first connection substrate (or an individual electrode connection substrate) 144, a liquid lens (or a liquid lens body), and a second connection substrate (or a common electrode connection substrate) 146.

The liquid lens may include a plurality of different kinds of liquids LQ1 and LQ2, first to third plates P1, P2 and P3, first and second electrodes E1 and E2, and an insulating layer 148.

The plurality of liquids LQ1 and LQ2 may be accommodated in a cavity CA, and may include a first liquid LQ1, which is conductive, and a second liquid (or an insulating liquid) LQ2, which is not conductive. The first liquid LQ1 and the second liquid LQ2 may not mix with each other, and an interface BO may be formed at a contact portion between the first liquid LQ1 and the second liquid LQ2. For example, the first liquid LQ1 may be disposed on the second liquid LQ2, but the embodiment is not limited thereto.

The inner surface of the first plate P1 may form a sidewall i of the cavity CA. The first plate P1 may include upper and lower openings having a predetermined inclined surface. That is, the cavity CA may be defined as a region surrounded by the inclined surface i of the first plate P1, the first opening contacting the second plate P2, and the second opening contacting the third plate P3.

The diameter of the opening that is larger among the first opening and the second opening may vary according to the field of view (FOV) required for the liquid lens or the role that the liquid lens plays in the camera module 100. The size (or the area or the width) of the first opening O1 may be greater than the size (or the area or the width) of the second opening O2. Here, the size of each of the first opening and the second opening may be the cross-sectional area in the horizontal direction (e.g. in the x-axis direction and the y-axis direction). For example, when each of the first and second openings has a circular cross-section, the size thereof may be a radius, and when each of the first and second openings has a square cross-section, the size thereof may be a diagonal length.

Each of the first and second openings may have the shape of a hole having a circular cross-section. The interface BO formed between the two liquids may be moved along the inclined surface i of the cavity CA by the driving voltage applied to the liquid lens.

The first liquid LQ1 and the second liquid LQ2 are charged, accommodated, or disposed in the cavity CA in the first plate P1. In addition, the cavity CA is a portion through which the light that has passed through the first lens passes. Therefore, the first plate P1 may be formed of a transparent material, or may include impurities so that light does not easily pass therethrough.

Electrodes may be disposed on one surface and another surface of the first plate P1. A plurality of first electrodes E1 may be spaced apart from a second electrode E2, and may be disposed on one surface (e.g. the bottom surface, the side surface, and the top surface) of the first plate P1. The second electrode E2 may be disposed on at least a portion of the other surface (e.g. the top surface) of the first plate P1, and may be in direct contact with the first liquid LQ1.

In addition, the first electrode E1 may be implemented as a plurality of electrodes (hereinafter, referred to as "individual electrodes"), and the second electrode E2 may be implemented as a single electrode (hereinafter, referred to as a "common electrode").

A portion of the second electrode E2 disposed on the other surface of the first plate P1 may be exposed to the first liquid LQ1, which is conductive.

Each of the first and second electrodes E1 and E2 may be formed of a conductive material.

In addition, the second plate P2 may be disposed on one surface of the second electrode E2. That is, the second plate P2 may be disposed on the first plate P1. Specifically, the second plate P2 may be disposed on the top surface of the second electrode E2 and the cavity CA.

The third plate P3 may be disposed on one surface of the first electrode E1. That is, the third plate P3 may be disposed under the first plate P1. Specifically, the third plate P3 may be disposed on the bottom surface of the first electrode E1 and under the cavity CA.

The second plate P2 and the third plate P3 may be disposed opposite each other, with the first plate P1 interposed therebetween. At least one of the second plate P2 or the third plate P3 may be omitted.

At least one of the second plate P2 or the third plate P3 may have a rectangular planar shape. Each of the second and third plates P2 and P3 may be a region through which light passes, and may be formed of a light-transmissive material. For example, each of the second and third plates P2 and P3 may be formed of glass. The second and third plates P2 and P3 may be formed of the same material as each other for convenience of processing.

As one example, light may be incident on the second plate P2 from the first lens. That is, in the cavity CA, the area of the first opening, oriented in the direction in which light is incident, may be greater than the area of the second opening, oriented in the opposite direction. To this end, the second plate P2 may have a configuration that allows light to travel into the cavity CA. The third plate P3 may have a configuration that allows the light that has passed through the cavity CA in the first plate P1 to travel to the second lens.

As another example, light may be incident on the third plate P3 from the first lens. That is, in the cavity CA, the area of the second opening, oriented in the direction in which light is incident, may be less than the area of the first opening, oriented in the opposite direction. To this end, the third plate P3 may have a configuration that allows light to travel into the cavity CA. The second plate P2 may have a configuration that allows the light that has passed through the cavity CA in the first plate P1 to travel to the second lens.

The second plate P2 may be in direct contact with the first liquid LQ1.

The insulating layer 148 may be disposed so as to cover a portion of the top surface of the third plate P3 under the cavity CA. That is, the insulating layer 148 may be disposed between the second liquid LQ2 and the third plate P3.

In addition, the insulating layer 148 may be disposed so as to cover the portion of the first electrode E1 that forms the sidewall of the cavity CA. In addition, the insulating layer 148 may be disposed so as to cover a portion of the second electrode E2, the first plate P1, and the first electrode E1 on the top surface of the first plate P1. Accordingly, contact between the first electrode E1 and the first liquid LQ1 and contact between the first electrode E1 and the second liquid LQ2 may be prevented by the insulating layer 148.

The insulating layer 148 may cover one (e.g. the first electrode E1) of the first and second electrodes E1 and E2, and may expose a portion of the other one thereof (e.g. the second electrode E2), so that electric energy is applied to the first liquid LQ1, which is conductive.

The first connection substrate 144 may electrically connect the plurality of first electrodes E1 included in the liquid lens to a main board (not shown). The second connection substrate 146 may electrically connect the second electrode E2 of the liquid lens to the main board. To this end, the first connection substrate 144 may be implemented as a flexible printed circuit board (FPCB), and the second connection substrate 146 may be implemented as an FPCB or a single metal substrate (a conductive metal plate).

The first connection substrate 144 may be electrically connected to an electrode pad formed on the main board via a connection pad electrically connected to each of the plurality of first electrodes E1.

The second connection substrate 146 may be electrically connected to an electrode pad formed on the main board via a connection pad electrically connected to the second electrode E2.

The main board may include a recess, in which the image sensor 26 may be mounted, seated, closely disposed, fixed, provisionally fixed, supported, coupled, or accommodated, and a circuit element (not shown). The circuit element of the main board may include a liquid lens control apparatus for controlling the liquid lens. The liquid lens control apparatus will be described later with reference to FIG. 4. The circuit element may include at least one of a passive element or an active element, and may have any of various areas and heights.

The main board may be implemented as a rigid flexible printed circuit board (RFPCB) including an FPCB. The FPCB may be bent according to the requirement of the space in which the camera module 100 is mounted.

FIGS. 3(a) and (b) are views for explaining the liquid lens 142, the interface of which is adjusted in response to a driving voltage. Specifically, FIG. 3(a) is a perspective view of the liquid lens 142 included in the lens assembly 22, and FIG. 3(b) illustrates an equivalent circuit of the liquid lens 142. The liquid lens 142 may correspond to the liquid lens shown in FIG. 2.

Referring to FIG. 3(a), the liquid lens 142, the interface BO of which is adjusted in shape in response to a driving voltage, may receive individual voltages through a plurality of individual electrodes E11, E12, E13 and E14, which are disposed at the same angular interval from each other in four different directions. The individual electrodes E11, E12, E13 and E14 may be disposed at the same angular interval from each other with respect to the central axis of the liquid lens 142. Although it is illustrated in FIG. 3(a) that four individual electrodes are respectively disposed at the four corners of the liquid lens, the embodiment is not limited thereto. Further, the liquid lens 142 may receive a common voltage through a common electrode E2.

The shape of the interface BO between the first liquid LQ1 and the second liquid LQ2, which are disposed in the cavity CA, may be changed by a driving voltage formed by the interaction between the individual voltages applied through the plurality of individual electrodes E11, E12, E13 and E14 and the common voltage applied through the common electrode E2. The shape and deformation of the interface BO between the first liquid LQ1 and the second liquid LQ2 may be controlled by the liquid lens control apparatus 200 shown in FIG. 4, which will be described later, in order to implement at least one of the AF function or the OIS function.

In addition, referring to FIG. 3(b), the liquid lens 142 may be constituted by a plurality of capacitors 143, one side of each of which receives an operating voltage from a corresponding one of the individual electrodes E11, E12, E13 and E14, which are different from each other, and the opposite side of each of which is connected to the common electrode E2. The plurality of capacitors 143 included in the equivalent circuit may have a low capacitance of about several tens to 200 picofarads (pF).

The operation of the liquid lens 142 configured as described above will be described below in detail.

The first connection substrate 144 and the second connection substrate 146 serve to supply a driving voltage for driving the liquid lens 142 to the first and second electrodes E1 and E2, respectively. When the driving voltage is applied to the first and second electrodes E1 and E2 through the first connection substrate 144 and the second connection substrate 146, the interface BO between the first liquid LQ1 and the second liquid LQ2 may be deformed, and at least one of the shape such as the curvature, the focal length, or the tilting angle of the liquid lens 142 may be changed (or adjusted). For example, the focal length of the liquid lens 142 may be adjusted with a change in at least one of the flexure or the inclination of the interface BO formed in the liquid lens 142 according to the driving voltage. In this manner, when the deformation, the radius of curvature, and the tilting angle of the interface BO are controlled, the camera module 100 including the liquid lens 142 may perform the auto-focusing (AF) function and the hand-tremor compensation or optical image stabilization (OIS) function.

For example, the first connection substrate 144 may respectively transmit four different individual voltages, namely first to fourth individual voltages, to the individual electrodes E11, E12, E13 and E14 of the liquid lens 142, and the second connection substrate 146 may transmit one common voltage to the common electrode E2 of the liquid lens 142. The common voltage may include direct-current (DC) voltage or alternating-current (AC) voltage. When the common voltage is applied in the form of a pulse, the width or duty cycle of the pulse may be constant.

Although not shown, a conductive epoxy may be disposed between the first connection substrate 144 and the plurality of first electrodes E1 so that the first connection substrate 144 and the plurality of first electrodes E1 may be in contact with, coupled to, and electrically connected to each other. In addition, a conductive epoxy may be disposed between the second connection substrate 146 and the second electrode E2 so that the second connection substrate 146 and the second electrode E2 may be in contact with, coupled to, and electrically connected to each other.

Hereinafter, the liquid lens control apparatus 200 according to the embodiment will be described with reference to the accompanying drawings.

FIG. 4 is a block diagram of the liquid lens control apparatus 200 according to the embodiment.

FIG. 5 is a waveform diagram of each part of the liquid lens control apparatus according to the embodiment and the liquid lens control apparatus according to the comparative example.

Reference numerals "Vco", "ADC_EN", "TIM", "SS1", "SS2", and "SS3" in FIG. 5 will be described based on the liquid lens control apparatus 200 according to the embodiment. "Vco" represents a common voltage, and "ADC_EN" may be a signal for performing analog-to-digital conversion (ADC) so that the controller acquires a capacitance corresponding to the position of the liquid interface BO of the liquid lens 300. For example, "ADC_EN" represents a signal for performing ADC so that the analog signal of the capacitance between the individual electrode and the common electrode, which is sensed corresponding to the position of the liquid interface BO of the liquid lens 300, is converted into a digital signal that can be acquired by the controller. That is, the controller 220 may sense the capacitance of the capacitor 143 shown in FIG. 3(b) during a period in which "ADC_EN" is at a "high" logic level. In FIG. 5, "TIM" represents a timer signal for driving a voltage booster 240, "BST" represents the state of the voltage booster 240, and "SS1" to "SS3" represent examples of waveform diagrams of various signals output from a gyro sensor 210. The OFF state of "BST", representing the state of the voltage booster 240, indicates that the voltage booster 240 is in a non-driving state. The non-driving state of the voltage booster 240 may be an inactivated state of the voltage booster 240. The inactivated state of the voltage booster 240 may be, for example, a disabled state, in which an enable signal is not input to an enable terminal, which is provided to activate the voltage booster 240, or a state in which a switch of the voltage booster 240 is not operated. The state in which the switch S of the voltage booster 240 is not operated may be a state in which the switch S stays in an ON or OFF state or a state in which the switch S is not turned ON or OFF. In the ON period of the "BST", the voltage booster 240 is enabled, and in the OFF period of the "BST", the voltage booster 240 is disabled.

The liquid lens control apparatus may include one gyro sensor 210. The waveforms of "SS1" to "SS3" shown in FIG. 5 may indicate three individual examples of the output from the gyro sensor 210 in order to show various outputs from the gyro sensor 210. In the "high" logic level periods of the "SS1" to "SS3", the gyro sensor 210 may output a motion signal or posture information of the liquid lens or the optical device including the liquid lens. The signal or information output from the gyro sensor 210 may be transmitted to the controller 220. The controller 220 may drive the liquid lens in response to the signal transmitted from the gyro sensor 210. The controller 220 may control the interface of the liquid lens by driving the liquid lens. The controller 220 may selectively use the signal transmitted from the gyro sensor 210. For example, when acquiring information from the gyro sensor 210, the controller 220 may take the most recent output from the gyro sensor 210.

Referring to FIG. 4, the liquid lens control apparatus 200 may include a gyro sensor 210, a controller 220, a driving signal generator 230, and a voltage booster 240.

The liquid lens control apparatus 200 shown in FIG. 4 may control the liquid lens 300, which operates in response to a driving signal. Here, the liquid lens 300 may correspond to the liquid lens 142 shown in FIGS. 2, 3(a) and (b) described above, but the embodiment is not limited thereto. That is, according to another embodiment, the liquid lens control apparatus 200 may also control a liquid lens having a different configuration from the liquid lens 142 shown in FIGS. 2, 3(a) and (b).

Hereinafter, for better understanding, the liquid lens 300 to be controlled by the liquid lens control apparatus 200 according to the embodiment will be described as being the liquid lens 142 shown in FIGS. 2, 3(a) and (b).

The gyro sensor 210 may sense a motion signal or posture information corresponding to the movement (i.e. shaking or hand tremor) or posture of the liquid lens 300 or the optical device including the liquid lens 300, and may output the sensed result SS to the controller 220. That is, the gyro sensor 210 may sense the angular velocity of movement in two directions, namely a yaw-axis direction and a pitch-axis direction, in order to compensate for the movement in the upward-downward direction and the leftward-rightward direction of the camera module 100 or the optical device including the camera module 100. The gyro sensor 210 may generate a motion signal corresponding to the sensed angular velocity, and may provide the motion signal to the controller 220. The controller 220 may acquire or read the information provided from the gyro sensor 210. The controller 220 may read or acquire a signal that is output or has been previously output from the gyro sensor 210 at the time point at which the controller 220 intends to acquire or read motion information. The controller 220 may store the signal information provided from the gyro sensor 210, and may acquire or read the stored gyro information at the time point at which the controller 220 intends to acquire or read the motion information.

The gyro sensor 210 may be an independent component, which is not included in the liquid lens control apparatus 200, or may be included in the liquid lens control apparatus 200, as shown in FIG. 4.

The voltage booster 240 may increase the level of a supply voltage VIN, and may output or transmit the supply voltage having the increased level to the driving signal generator 230. The supply voltage may be an input voltage, which is input to the liquid lens control apparatus 200. For example, the voltage booster 240 may be enabled or disabled in response to the timer signal TIM. For example, as illustrated in FIG. 5, the voltage booster 240 may be enabled (ON) at the rising edge of the timer signal TIM, and may be disabled (OFF) at the falling edge of the timer signal TIM.

To this end, the liquid lens control apparatus 200 according to the embodiment may further include a timer 250. The timer 250 may generate the timer signal TIM for enabling or disabling the voltage booster 240, and may output the generated timer signal TIM to the voltage booster 240. For example, the timer 250 may generate the timer signal TIM under the control of the controller 220.

When enabled (ON) in response to the timer signal TIM, the voltage booster 240 may increase the level of the voltage output from the voltage booster 240 using the supply voltage VIN. Alternatively, when disabled (OFF) in response to the timer signal TIM, the voltage booster 240 may stop the operation of increasing the level of the voltage output from the voltage booster 240.

According to the embodiment, the supply voltage VIN may be 1.8 volts to 5 volts, and the level of the voltage output from the voltage booster 240 may be 50 volts or more.

According to the embodiment, the voltage booster 240 may include an inductor L, a diode D, and a switch S. The inductor L may have one side connected to the supply voltage VIN and an opposite side connected to the anode of the diode D. The diode D may have an anode connected to the inductor L and a cathode connected to the driving signal generator 230. The switch S may be disposed between the opposite side of the inductor L and a reference potential (e.g. a ground voltage). Since the voltage booster 240 is enabled (ON) at the rising edge of the timer signal TIM provided from the timer 250 and the switch S of the voltage booster 240 performs switching operation, the level of the supply voltage VIN, which is 1.8 to 5 volts, may increase to 50 volts or more. In this case, the switching frequency of the switch S may be 10 kHz. However, the embodiment is not limited thereto.

The driving signal generator 230 may respond to a control signal C, may generate a driving signal using the output from the voltage booster 240, and may supply the generated driving signal to the liquid lens 300. The driving signal output from the driving signal generator 230 may be a voltage in the form of a pulse having a predetermined width, which is applied to each electrode of the liquid lens 300. The driving voltage applied to the liquid lens 300 is the difference between voltages respectively applied to the first electrode E1 and the second electrode E2.

Although not shown, the driving signal generator 230 may further include at least one of a voltage stabilizer (not shown) or a switching unit (not shown). The voltage stabilizer serves to stabilize the output from the voltage booster 240. In addition, the switching unit serves to selectively supply the output from the voltage booster 240 to each terminal of the liquid lens 300. Here, the switching unit may include a circuit called an H bridge. The high voltage output from the voltage booster 240 may be applied to the switching unit as power supply voltage. The switching unit may selectively supply the applied power supply voltage and a reference potential (e.g. a ground voltage) across the two ends of the liquid lens 300. The two ends of the liquid lens 300 may respectively be any one of the plurality of individual electrodes (e.g. E11, E12, E13 and E14) and the second electrode E2.

The controller 220 is configured to perform the AF function and the OIS function. The controller 220 may control the liquid lens 300 included in the lens assembly 22 in response to a user request or a detection result (e.g. a motion signal of the gyro sensor 210).

The controller 220 may receive information (i.e. information about the distance to an object) for performing the AF function from the inside (e.g. the image sensor 26) or the outside (e.g. a distance sensor or an application processor) of the optical device or the camera module 100, may calculate a driving voltage corresponding to the shape that the liquid lens 300 needs to have according to the focal length for focusing the lens on the object using the distance information, and may generate a control signal C based thereon.

In addition, the controller 220 may store information provided from the gyro sensor 210. In addition, the controller 220 may read the information provided from the gyro sensor 210 or the information stored in the controller and use the same. The controller 220 may generate a control signal C using the read information, which is provided from the gyro sensor 210, and may output the generated control signal C to the driving signal generator 230.

Although not shown, in order to implement the OIS function, the controller 220 may further include a low-pass filter (LPF) (not shown). The LPF may extract only a desired band by removing a high-frequency noise component from a motion signal output from the gyro sensor 210, may calculate the amount of hand tremor using the denoised motion signal, may calculate a driving voltage corresponding to the shape that the liquid lens 300 needs to have in order to compensate for the calculated amount of hand tremor, and may generate a control signal C based thereon.

According to the embodiment, the time point at which the controller 220 acquires a motion signal SS from the gyro sensor 210 may be set variously as follows.

In order to drive the liquid lens 300, a relatively high voltage, which is higher than that used in a general device (e.g. a mobile phone), is required, and thus the voltage booster 240 is required. The voltage booster 240 is a circuit that generates a high voltage using a low-voltage input and may generate noise when driven. Therefore, in order to minimize noise caused by the voltage booster 240, the liquid lens control apparatus 200 may perform sensing operation and signal transmission/reception during a period other than the driving period of the voltage booster 240, which will be described later.

According to an embodiment, the position of the interface of the liquid lens 300 may be detected using the capacitance value between the individual electrode and the common electrode of the liquid lens 300. The ADC operation for sensing the capacitance value between the two electrodes may be performed in the OFF state of the voltage booster 240. FIG. 5 illustrates an embodiment in which the "ADC_EN" signal for sensing the capacitance value is input in the OFF state of the voltage booster 240.

According to still another embodiment, the time point at which the controller 220 reads the information on movement of the liquid lens 300 sensed by the gyro sensor 210 may be set within a period in which the voltage booster 240 is in the OFF state. Referring to FIG. 5, the period T2 is a period in which the controller 220 reads information corresponding to information about the position of the liquid lens 300 output from the gyro sensor 210. Reading a signal by the controller 220 means that the controller 220 acquires or reads a signal in order to control the driving signal using the signal. The controller 220 may read output from the gyro sensor 210 that is stored in the controller, or may directly read output from the gyro sensor 210.

Another embodiment will now be described with reference to FIG. 5. The gyro sensor 210 may periodically output information on the position or posture of the liquid lens 300 or the optical device including the liquid lens 300 to the controller 220. In this case, since the output period of the gyro sensor 210 and the ON/OFF period of the voltage booster 240 are different from each other, some of the outputs from the gyro sensor 210 (e.g. "S1", "S21", "S22"

and "S3" of "SS1", "SS2" and "SS3" of FIG. 5) may be outputs on position information of the liquid lens 300 in a period in which the voltage booster 240 is in the ON state, and thus may include noise of the voltage booster 240. The remaining outputs from the gyro sensor 210 (e.g. the pulses other than "S1", "S21", "S22" and "S3" of "SS1", "SS2" and "SS3" of FIG. 5) may be outputs on position information of the liquid lens 300 in a period in which the voltage booster 240 is in the OFF state, and thus may not include noise of the voltage booster 240. The controller 220 needs to use a gyro signal that does not include noise of the voltage booster 240 in order to perform control based on more accurate position information. For example, the controller 220 may read information output from the gyro sensor 210, which is output during the period T2 or has been output before the period T2 of FIG. 5, during the period T2 (for example, may use the information that has been output from the gyro sensor 210 immediately before the period T2, among the pieces of information that have been output from the gyro sensor 210 before the period T2). In this case, among the outputs from the gyro sensor 210, which are indicated by "SS1" to "SS3" in FIG. 5, the controller 220 may use the gyro signal that has been output in the OFF state of the voltage booster 240. The period T2, in which the controller 220 reads information output from the gyro sensor 210, may be within a period in which the voltage booster 240 is in the OFF state. In addition, the period T2, in which the controller 220 reads information output from the gyro sensor 210, may be within a period after the ADC operation has been performed on the information on the capacitance value and before the voltage booster 240 is turned ON. In addition, the period T2 may be set closer to the time point at which the voltage booster 240 is turned from OFF to ON than to the time point at which the voltage booster 240 is turned from ON to OFF. The controller 220 may sense the ADC value corresponding to the position of the liquid interface BO of the liquid lens 300, and thereafter may read the signal SS output from the gyro sensor 210 when a predetermined time period T1 has elapsed. Referring to FIG. 5, the controller 220 may sense the ADC value corresponding to the position of the liquid interface BO of the liquid lens 300 during a period in which "ADC_EN" is at a "high" logic level. Accordingly, the controller 220 may read the signal SS output from the gyro sensor 210 during the period T2 within a period after a predetermined time period T1 has elapsed from the falling edge of "ADC_EN" and before the timer signal TIM is switched from the "low" logic level to the "high" logic level. For example, the predetermined time period T1 may be 30 µs to 40 µs, but the embodiment is not limited thereto.

The period T2 in which the controller 220 reads information output from the gyro sensor 210 may be spaced a predetermined amount of time apart from the falling edge of the signal ADC_EN for reading information on the capacitance value. In addition, the period T2 may be within a period immediately before the voltage booster 240 is turned ON.

The controller 220 may read the motion signal SS output from the gyro sensor 210 before a predetermined time period elapses from the time point at which the voltage booster 240 is enabled. Referring to FIG. 5, the controller 220 may acquire the motion signal SS from the gyro sensor 210 before a predetermined time period elapses from the time point at which the state BST of the voltage booster 240 is switched from the disabled state OFF to the enabled state ON or immediately before the switching time point.

The controller 220 may read the motion information SS output from the gyro sensor 210 before a predetermined time period elapses from the time point at which the timer signal TIM is generated (i.e. the rising edge of the timer signal TIM) to enable the voltage booster 240. Referring to FIG. 5, the controller 220 may read the motion signal SS output from the gyro sensor 210 before a predetermined time period T2 elapses from the rising edge of the timer signal T1M.

The motion signal generated by the gyro sensor 210 may be continuously provided to the controller 220. However, as described above with reference to the first to third embodiments, the controller 220 may not acquire the motion signal in the enabled (ON) state of the voltage booster 240, but may acquire the motion signal in the disabled (OFF) state of the voltage booster 240 before the voltage booster 240 is enabled.

In the above manner, the controller 220 is more likely to receive a signal that the gyro sensor 210 acquires or outputs during the period in which the voltage booster 240 is in the OFF state or to receive a gyro sensor signal including reduced noise.

While the output frequency FB of the motion signal sensed by the gyro sensor 210 is 8 kHz, the driving frequency FA of the controller 220 or the frequency at which the voltage booster 240 is controlled may be 5 kHz. That is, referring to FIG. 5, while the period TA of the common voltage Vco in the form of pulse width modulation (PWM) is 200 µs, the period TB of the motion signal SS (SS1 to SS3) may be 125 µs. That is, the motion signal may be continuously supplied from the gyro sensor 210 to the controller 220 at a period of 125 µs.

As described above, since the driving frequency FA of the controller 220 or the frequency at which the voltage booster 240 is controlled is different from the output frequency FB of the gyro sensor 210, the period in which the motion signal continuously provided to the controller 220 is read by the controller 220 is very important. The reason is as follows. As shown in FIG. 5, in the enabled state of the voltage booster 240 (the ON state of "BST"), physical vibration or electrical noise occurs due to the voltage booster 240. If the controller 220 uses the information output from the gyro sensor 210 in this state, it is difficult for the controller to perform accurate control using position or posture information, which is affected by the noise of the voltage booster 240.

In the liquid lens control apparatus according to the comparative example, when the controller 220 reads a gyro signal at the rising edge of the signal ADC_EN, the controller 220 reads the gyro signal S1 output in the enabled state of the voltage booster 240 (the ON state of "BST") among the first motion signal SS1 shown in FIG. 5, and thus receives the gyro signal S1 including noise caused by the voltage booster 240. Alternatively, in the liquid lens control apparatus according to the comparative example, when the controller 220 receives a gyro signal SS at the falling edge of the signal ADC_EN, the controller 220 reads the gyro signals S21 and S22 output in the enabled state of the voltage booster 240 (the ON state of "BST") among the second motion signal SS2 shown in FIG. 5, and thus receives the gyro signals S21 and S22 including noise caused by the voltage booster 240. In the liquid lens control apparatus according to the comparative example, when the controller 220 reads a gyro signal SS at the falling edge of the signal ADC_EN, the third motion signal SS3 shown in FIG. 5 is a signal S3 output in the enabled state of the voltage booster 240 (the ON state of "BST"), and thus the controller may receive a signal having noise.

As described above, when noise is introduced into the motion signals SS1 to SS3 by the operation of the voltage booster, the OIS function of the camera module 100 including the liquid lens 300 may be deteriorated.

On the other hand, in the liquid lens control apparatus 200 according to the embodiment, the controller 220 acquires a motion signal SS output in the disabled (OFF) state of the voltage booster 240. For example, the controller does not acquire a motion signal SS in the enabled (ON) state of the voltage booster 240, and reads the motion signal SS output from the gyro sensor 210 during the above-described period within a period in which the voltage booster 240 is in the disabled (OFF) state before being enabled. Accordingly, in the liquid lens control apparatus 200 according to the embodiment, the controller 220 controls the liquid lens 300 using the motion signal SS having no noise, whereby the OIS function performed by the camera module 100 including the liquid lens 300 may be improved.

In addition, as described above, the liquid lens control apparatus 200 according to the embodiment controls the liquid lens 300 using a motion signal having no noise. As a result, when the excitation frequency is 2 Hz to 10 Hz, the suppression ratio of the liquid lens 300 may be improved.

Although only a limited number of embodiments have been described above, various other embodiments are possible. The technical contents of the above-described embodiments may be combined into various forms as long as they are not incompatible with one another, and thus may be implemented in new embodiments.

An optical device may be implemented using the camera module 100 including the liquid lens control apparatus 200 according to the embodiments described above. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include the lens assembly.

In addition, the optical device may be implemented in a portable device such as, for example, a smartphone, a laptop computer, or a tablet computer. Such an optical device may include the camera module 100, a display (not shown) configured to output an image, a battery (not shown) configured to supply power to the camera module 100, and a body housing in which the camera module 100, the display, and the battery are mounted. The optical device may further include a communication module capable of communicating with other devices and a memory unit capable of storing data. The communication module and the memory unit may also be mounted in the body housing.

It will be apparent to those skilled in the art that various changes in form and details may be made without departing from the spirit and the essential characteristics of the disclosure set forth herein. Accordingly, the above detailed description is not intended to be construed as limiting the disclosure in all aspects and to be considered by way of example. The scope of the disclosure should be determined by reasonable interpretation of the accompanying claims, and all equivalent modifications made without departing from the disclosure should be included in the scope of the disclosure.

MODE FOR INVENTION

Various embodiments have been described in the best mode for carrying out the disclosure.

INDUSTRIAL APPLICABILITY

A liquid lens control apparatus according to the embodiments may be used in portable devices such as, for example, camera/video devices, telescopic devices, microscopic devices, an interferometer, a photometer, a polarimeter, a spectrometer, a reflectometer, an auto-collimator, a lens-meter, a smartphone, a laptop computer, and a tablet computer.

The invention claimed is:

1. A liquid lens control apparatus, comprising:
   a liquid lens configured to control an interface between liquids in response to a driving voltage;
   a voltage booster configured to increase a level of a supply voltage and output a voltage having a higher level than the supply voltage;
   a controller configured to control the driving voltage; and
   a gyro sensor configured to sense movement of the liquid lens and output a signal corresponding to movement of the liquid lens,
   wherein the controller acquires a signal corresponding to movement of the liquid lens output from the gyro sensor during a period in which the voltage booster is in an OFF state, and controls the driving voltage using the signal corresponding to movement of the liquid lens.

2. The liquid lens control apparatus according to claim 1, further comprising:
   a driving signal generator configured to supply the driving voltage to the liquid lens using a voltage output from the voltage booster,
   wherein the controller controls the driving signal generator using a signal corresponding to movement of the liquid lens.

3. The liquid lens control apparatus according to claim 2, wherein the voltage booster comprises:
   an inductor having one side connected to an input terminal to which the supply voltage is input; and
   a switch disposed between an opposite side of the inductor and a reference potential, and
   wherein the voltage booster increases a level of the supply voltage through a switching operation of the switch and outputs a voltage having a higher level than the supply voltage.

4. The liquid lens control apparatus according to claim 3, wherein the voltage booster comprises a diode having an anode connected to the inductor and a cathode connected to the driving signal generator.

5. The liquid lens control apparatus according to claim 1, wherein a period in which the controller acquires a signal corresponding to movement of the liquid lens is closer to a time point at which the voltage booster is turned from OFF to ON than to a time point at which the voltage booster is turned from ON to OFF.

6. The liquid lens control apparatus according to claim 1, wherein the liquid lens comprises an individual electrode and a common electrode to which the driving voltage is applied, and performs analog-to-digital conversion (ADC) on a capacitance between the individual electrode and the common electrode, corresponding to the interface of the liquid lens, in an OFF state of the voltage booster, and
   wherein the controller acquires a signal corresponding to movement of the liquid lens after the ADC has been performed.

7. The liquid lens control apparatus according to claim 6, wherein the ADC is controlled to be performed when an ADC enable pulse is turned ON, and wherein the controller acquires a signal corresponding to movement of the liquid lens after a predetermined time period elapses from a time point at which the ADC enable pulse is turned OFF.

8. The liquid lens control apparatus according to claim 7, wherein the predetermined time period is 30 µs to 40 µs.

9. The liquid lens control apparatus according to claim 6, wherein the controller acquires the signal corresponding to the movement of the liquid lens output from the gyro sensor, after the ADC operation has been performed and before the voltage booster is turned ON.

10. The liquid lens control apparatus according to claim 1, wherein a frequency of the signal output from the gyro sensor and an ON/OFF frequency of the voltage booster are different from each other.

11. The liquid lens control apparatus according to claim 1, wherein the supply voltage is 1.8 volts to 5 volts, and
wherein an increased level of the supply voltage output from the voltage booster is 50 volts or more.

12. The liquid lens control apparatus according to claim 1, comprising a timer generating a timer signal under a control of the controller,
wherein the voltage booster is configured to enable or disable in response to the timer signal.

13. A liquid lens control apparatus, comprising:
a liquid lens configured to control an interface between liquids in response to a driving voltage;
a voltage booster configured to increase a level of a supply voltage and output a voltage having the increased level;
a driving signal generator configured to generate the driving voltage using the voltage output from the voltage booster in response to a control signal;
a gyro sensor configured to sense movement of the liquid lens and output a movement signal corresponding to the sensing result; and
a controller configured to acquire the movement signal in a signal acquisition period, and generate the control signal using the acquired movement signal,
wherein the signal acquisition period belongs to a period in which the voltage booster is in a non-driving state.

14. The liquid lens control apparatus according to claim 13, wherein the controller stores the movement signal, and
wherein the controller acquires the stored movement signal or the movement signal output from the gyro sensor, in the signal acquisition period.

15. The liquid lens control apparatus according to claim 13, wherein the liquid lens comprises an individual electrode and a common electrode to which the driving voltage is applied,
wherein the controller senses a capacitance between the individual electrode and the common electrode in a sensing period, the capacitance corresponding to the interface of the liquid lens, and
wherein the sensing period belongs to the period in which the voltage booster is in the non-driving state.

16. The liquid lens control apparatus according to claim 15, wherein the sensing period is spaced a predetermined amount of time apart from the signal acquisition period.

17. The liquid lens control apparatus according to claim 13, wherein the signal acquisition period is positioned immediately before the voltage booster in the non-driving state starts to be driven.

18. The liquid lens control apparatus according to claim 13, wherein a driving frequency of the controller or a frequency at which the voltage booster is controlled is different from an output frequency of the gyro sensor.

19. The liquid lens control apparatus according to claim 13, wherein the gyro sensor periodically outputs the movement signal to the controller.

20. The liquid lens control apparatus according to claim 13, wherein the gyro sensor senses an angular velocity of movement in two directions of a yaw-axis direction and a pitch-axis direction, as the movement signal.

* * * * *